S. L. Hill,

Alphabet Blocks,

№ 2,528, Reissued Mar. 26, 1867.

Witnesses.

Aldney Doane

Albert Palmer

Inventor

Samuel L. Hill

United States Patent Office.

SAMUEL L. HILL, OF WILLIAMSBURG, NEW YORK, ASSIGNOR TO HIMSELF ALBERT PALMER, AND A. SIDNEY DOANE.

*Letters Patent No.* 21,798, *dated October* 12, 1858; *reissue No.* 2,528, *dated March* 26, 1867.

SPELLING-BLOCK.

The Schedule referred to in these Letters Patent and making part of the same.

TO ALL WHOM IT MAY CONCERN:

Be it known that I, SAMUEL L. HILL, of New York, in the county and State of New York, have invented, made, and applied to use certain new and useful Spelling-Blocks; and I do declare the following to be a full, clear, and correct description of my invention, reference being had to the accompanying drawings, making part of this specification, and to the letters of reference marked thereon, in which—

Figure 1:
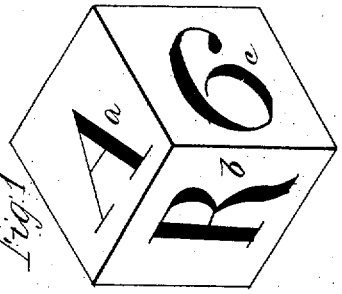

Figure 1, a view showing three sides of a block used by me.

Figure 2:
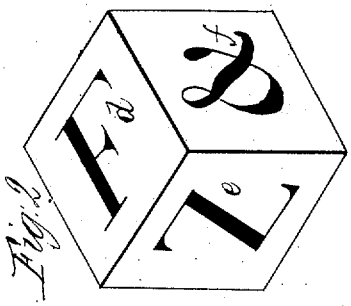

Figure 2, a view showing the opposite sides of the same.

Figure 3:
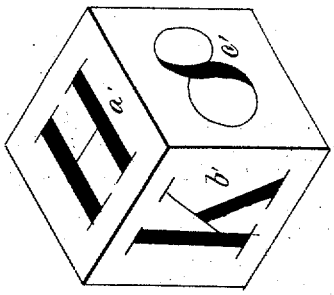

Figure 3, a view showing three sides of a second block used by me.

Figure 4:
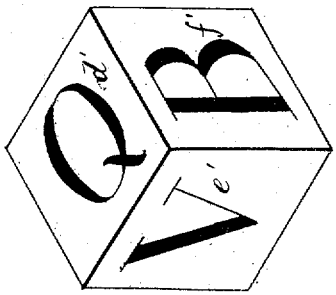

Figure 4, a view showing the remaining sides of the same.

In the drawings like parts of the invention are designated by the same letters of reference.

The nature of my invention consists—

*a.* In placing different letters of the alphabet upon two or more sides of cubical or six-sided blocks, so that, by combining the blocks, words in which the same letters occur more than once may be readily spelled.

*b.* In giving to and placing upon each block its proper numeral, for the purpose hereinafter set forth.

To enable those skilled in the arts to make and use my invention, I will describe the same.

I use any number of cubical or six-sided blocks, which have placed upon them the numerals, as hereinafter described. Upon five (5) sides of each block I place five letters of the alphabet, and upon the sixth side the numeral, or its equivalent. This numeral serves, in connection with a printed key, to show on what block any desired letter or letters may be found. The blocks being thus constructed, and reference being had to the numerals placed thereon and the printed key, it will be found that words can be readily spelled by combining the requisite number of blocks and those words in which the same letter occurs more than once, which was not possible with the style of blocks now in use. Thus, the word "dog" could be spelled with the old style, but the word "goose," or any other word in which the same letter occurred twice, could not be. Sentences also, the number of blocks being increased, may be readily spelled. The utility of my invention is found in the fact that children are not only taught their letters by the use of my blocks, but are also taught to spell.

Having thus described my invention, what I claim as new, and desire to secure by Letters Patent, is—

1. I claim placing different letters of the alphabet upon two or more sides of cubical or six-sided blocks, so that, by combining the same, words in which the same letter occurs more than once may be readily spelled.

2. I claim placing upon each block its proper numeral, for the purpose specified.

SAMUEL L. HILL.

Witnesses.

A. SIDNEY DOANE,

C. O. GORDON.